US010841841B2

(12) United States Patent
Smith et al.

(10) Patent No.: US 10,841,841 B2
(45) Date of Patent: Nov. 17, 2020

(54) USING WIRELESS CHANNEL VARIANCE VALUES IN ORDER TO IMPROVE APPLICATION QUALITY OF EXPERIENCE (QOE) IN WIRELESS COMMUNICATION SYSTEMS

(71) Applicant: Cisco Technology, Inc., San Jose, CA (US)

(72) Inventors: Malcolm Muir Smith, Richardson, TX (US); Sergio Mena, Saubraz (CH); Lorenzo Granai, Crissier (CH); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 16/133,314

(22) Filed: Sep. 17, 2018

(65) Prior Publication Data

US 2020/0092756 A1    Mar. 19, 2020

(51) Int. Cl.
*H04W 28/24* (2009.01)
*H04W 28/02* (2009.01)
*H04W 28/20* (2009.01)
*H04B 17/336* (2015.01)
*H04B 17/318* (2015.01)

(52) U.S. Cl.
CPC .......... *H04W 28/24* (2013.01); *H04B 17/318* (2015.01); *H04B 17/336* (2015.01); *H04W 28/0236* (2013.01); *H04W 28/20* (2013.01)

(58) Field of Classification Search
CPC . H04W 28/24; H04W 28/0236; H04W 28/20; H04B 17/318; H04B 17/236
See application file for complete search history.

(56) References Cited

U.S. PATENT DOCUMENTS

| 8,385,221 | B2 | 2/2013 | Chetlur et al. | |
|---|---|---|---|---|
| 9,538,409 | B2 | 1/2017 | Hui et al. | |
| 2004/0179497 | A1* | 9/2004 | Foore | H04J 3/1682 370/335 |
| 2005/0215249 | A1* | 9/2005 | Little | H04W 4/18 455/431 |
| 2009/0016352 | A1* | 1/2009 | Wang | H03M 13/356 370/394 |
| 2012/0047547 | A1* | 2/2012 | Patti | H04N 21/2365 725/127 |
| 2013/0210347 | A1* | 8/2013 | Ling | H04B 17/309 455/41.1 |
| 2013/0267173 | A1* | 10/2013 | Ling | H04B 5/0081 455/41.1 |
| 2013/0290492 | A1 | 10/2013 | El Arabawy et al. | |

(Continued)

*Primary Examiner* — Habte Mered
(74) *Attorney, Agent, or Firm* — Patterson + Sheridan, LLP (57) ABSTRACT

A method comprises obtaining a wireless channel variance value. The wireless channel variance value is indicative of a degradation to a specified bandwidth of the wireless channel as a function of conditions of the wireless channel. The method further includes determining a reliably usable bandwidth value of the wireless channel as a function of the wireless channel variance value. The method further includes determining a data frame transmission rate associated with a particular application running on the client device, wherein the data frame transmission rate is constrained by a function of the reliably usable bandwidth value and a quality of experience (QoE) level value.

20 Claims, 8 Drawing Sheets

(56) References Cited

U.S. PATENT DOCUMENTS

| | | | | |
|---|---|---|---|---|
| 2014/0286173 A1* | 9/2014 | Bhandari | .......... | H04W 28/0236 |
| | | | | 370/238 |
| 2014/0337871 A1 | 11/2014 | De Blas et al. | | |
| 2015/0244760 A1* | 8/2015 | Tun | ...................... | H04N 21/438 |
| | | | | 709/223 |
| 2015/0334703 A1* | 11/2015 | Xu | .................... | H04W 72/0446 |
| | | | | 370/253 |
| 2015/0350957 A1* | 12/2015 | Mannemala | .......... | H04W 28/22 |
| | | | | 370/329 |
| 2016/0277775 A1* | 9/2016 | Yoshimoto | ......... | H04N 21/2385 |
| 2017/0099327 A1* | 4/2017 | Negalaguli | ............... | H04L 1/00 |
| 2017/0237673 A1* | 8/2017 | Law | ........................ | H04L 47/25 |
| | | | | 370/338 |
| 2017/0317739 A1* | 11/2017 | Emmanuel | .......... | H04W 72/048 |
| 2018/0176044 A1 | 6/2018 | Dogan et al. | | |
| 2019/0045400 A1* | 2/2019 | Li | ........................ | H04L 5/0064 |

* cited by examiner

USING WIRELESS CHANNEL VARIANCE VALUES IN ORDER TO IMPROVE APPLICATION QUALITY OF EXPERIENCE (QOE) IN WIRELESS COMMUNICATION SYSTEMS

TECHNICAL FIELD

The present disclosure relates generally to wireless networking, and in particular, using wireless channel variance values in order to improve application quality of experience (QoE) in wireless communication systems.

BACKGROUND

Certain current deployments include mechanisms for managing quality of experience (QoE) associated with an application running on a client device, such as a mobile phone. These mechanisms, however, often utilize network specifications that do not reliably characterize conditions of the wireless networks in determining whether and how to change the communication of wireless traffic. Accordingly, these systems change the nature of wireless traffic communication in a manner that does not improve, and sometimes even degrades, QoE with respect to a corresponding application running on the client device.

It would, therefore, be useful for a system to exploit characteristics of the wireless channel that more accurately reflect the ground truth of the system in order to improve the application quality of experience QoE at the client device.

BRIEF DESCRIPTIONS OF THE DRAWINGS

For a better understanding of aspects of the various implementations described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, devices, and methods to enable using wireless channel variance values in order to improve application quality of experience (QoE) in wireless communication systems. A method comprises obtaining a wireless channel variance value. The wireless channel variance value is indicative of a degradation to a specified bandwidth of the wireless channel as a function of conditions of the wireless channel. The method further includes determining a reliably usable bandwidth value of the wireless channel as a function of the wireless channel variance value. The method further includes determining a data frame transmission rate associated with a particular application running on the client device, wherein the data frame transmission rate is constrained by a function of the reliably usable bandwidth value and a quality of experience (QoE) level value.

In accordance with some implementations, an endpoint device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an endpoint device, cause the endpoint device to perform or cause performance of any of the methods described herein. In accordance with some implementations, an endpoint device includes: one or more processors, a non-transitory memory, and means for performing or causing performance of any of the methods described herein.

EXAMPLE EMBODIMENTS

Increasingly, a given client device, sometimes referred to as a client device or user equipment (UE), includes mechanisms for changing how it communicates wireless network traffic. In certain deployments, the client device includes multiple radios for communicating with multiple endpoint devices (e.g., access point in an IEEE 802-based network; base station, such as a 5G cellular base station and/or 5G non-cellular base station; etc.) that provide respective wireless network connectivity. Moreover, the client device often includes a mechanism for steering traffic between the wireless networks. For example, in what is sometimes referred to as a heterogenous network, a client device may steer traffic between wireless networks characterized by different radio access technologies (RATs), such as between an IEEE 802-based network (e.g., Wi-Fi) and a cellular based network (e.g., 4G/LTE/5G), and vice versa. Additionally and/or alternatively, some deployments include a mechanism for selecting how much to compress traffic based on advertised specifications of a corresponding wireless channel over which the traffic is communicated. In the context of certain applications, such as video and audio applications, a client device selects a particular codec in order to set encoding and/or decoding operations on a data stream (e.g., video or audio stream). The particular codec may be associated with a preset encoding and decoding rate.

Notably, the associated wireless channel that communicates the wireless traffic to and from the client device varies with time. Variances in the wireless channel are affected by wireless channel properties and ambient environmental conditions, as will be detailed below. As the wireless channel varies, so does the actual reliably usable bandwidth value of a wireless channel. As such, channel variances introduce an unusable bandwidth margin between a specified (e.g., advertised) bandwidth of a wireless channel and the reliably usable bandwidth value of a wireless channel. In turn, as is the case in current systems, applications that rely on the specified bandwidth are likely to experience a degradation in QoE, because the specified bandwidth corresponds to an overestimate of the reliably usable bandwidth value of the wireless channel.

Accordingly, current systems fail to account for the reliably usable bandwidth value of the wireless channel, leading to poor application QoE at the client device. For example, in some current deployments, the client device utilizes wireless network specifications (e.g., advertised bandwidth) of a wireless network provider (e.g., access point, cellular base station, and/or the like) in making wireless traffic communication decisions. For example, an access point may advertise a certain bandwidth level (e.g., 11 Gbps), and in response the client device selects a particular codec. However, advertised network specifications are often indicative of best-case conditions are therefore do not account for degradations in channel conditions. As another example, in current deployments, the client device includes a system (e.g., video congestion controller) for estimating an instantaneous available bandwidth level. However, these systems produce inaccurate estimates when non-marginal bandwidth variations exist. Thus, current systems fail to account for degradations in channel conditions.

In contrast to current systems, implementations disclosed herein utilize a reliably usable bandwidth value of a wireless channel in making wireless communication decisions. The reliably usable bandwidth value accounts for degradations to a specified bandwidth of the wireless channel as a function of conditions of the wireless channel. Namely, various implementations disclosed herein obtain a wireless channel variance value that is indicative of the degradation. Based on the reliably usable bandwidth value and a quality of experience (QoE) level value, a data frame transmission rate associated with a particular application running on the client device is determined. Determining the data frame transmission rate based on wireless channel variance enables the client device to change wireless traffic communications (e.g., selecting a different codec, selecting a different wireless communication channel, and/or the like) in order to improve associated application QoE. For example, in some implementations, improved application QoE results from less packet loss and/or packet delay.

Figure 1:
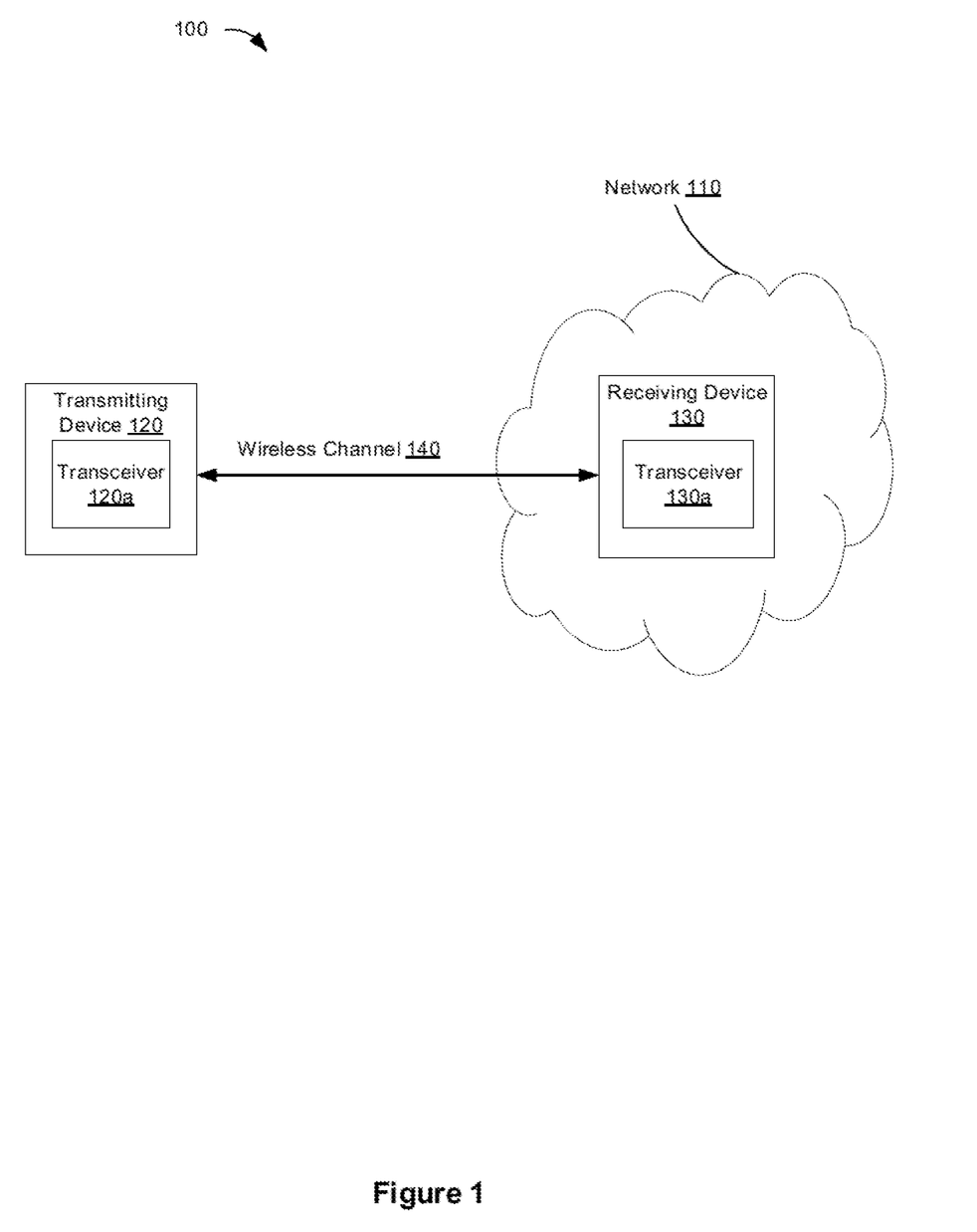
FIG. 1 is a block diagram of an example of a wireless networking environment in accordance with some implementations.

FIG. 1 is a block diagram of an example of a wireless networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the wireless networking environment 100 includes a transmitting device 120 transmitting traffic (e.g., data frames) to a receiving device 130 in a network 110 over a wireless channel 140. The transmitting device 120 includes a respective transceiver 120a and the receiving device 130 also includes a respective transceiver 130a. One of ordinary skill in the art will appreciate that because the transmitting device 120 and the receiving device 130 both include respective transceivers 120a and 130a, other implementations include the transmitting device 120 additionally or alternatively receiving traffic from the receiving device 130.

In various implementations, the specified bandwidth of the wireless channel 140 is affected (e.g., degraded) by environmental ambient conditions, one or more properties of the wireless channel 140, or a combination thereof. In some implementations, the environmental ambient conditions include one or more of: physical obstacles between the transmitting device 120 and the receiving device 130; weather; humidity; distance between the transmitting device 120 and the receiving device 130; whether the transmitting device 120 and the receiving device 130 are indoors and/or outdoors; background traffic; and/or the like. In some implementations, the one or more properties of the wireless channel 140 include one or more of: a received signal strength indication (RSSI) associated with the wireless channel 140; fading level of the wireless channel 140; a signal to noise ratio (SNR) level of the wireless channel 140; noise level of the wireless channel 140; interference level from other client devices that are also in communication with the transmitting device 120 and/or the receiving device 130; energy per bit to noise-power spectral density ratio value of the wireless channel 140; and/or distortion level of the wireless channel 140.

Figure 2:
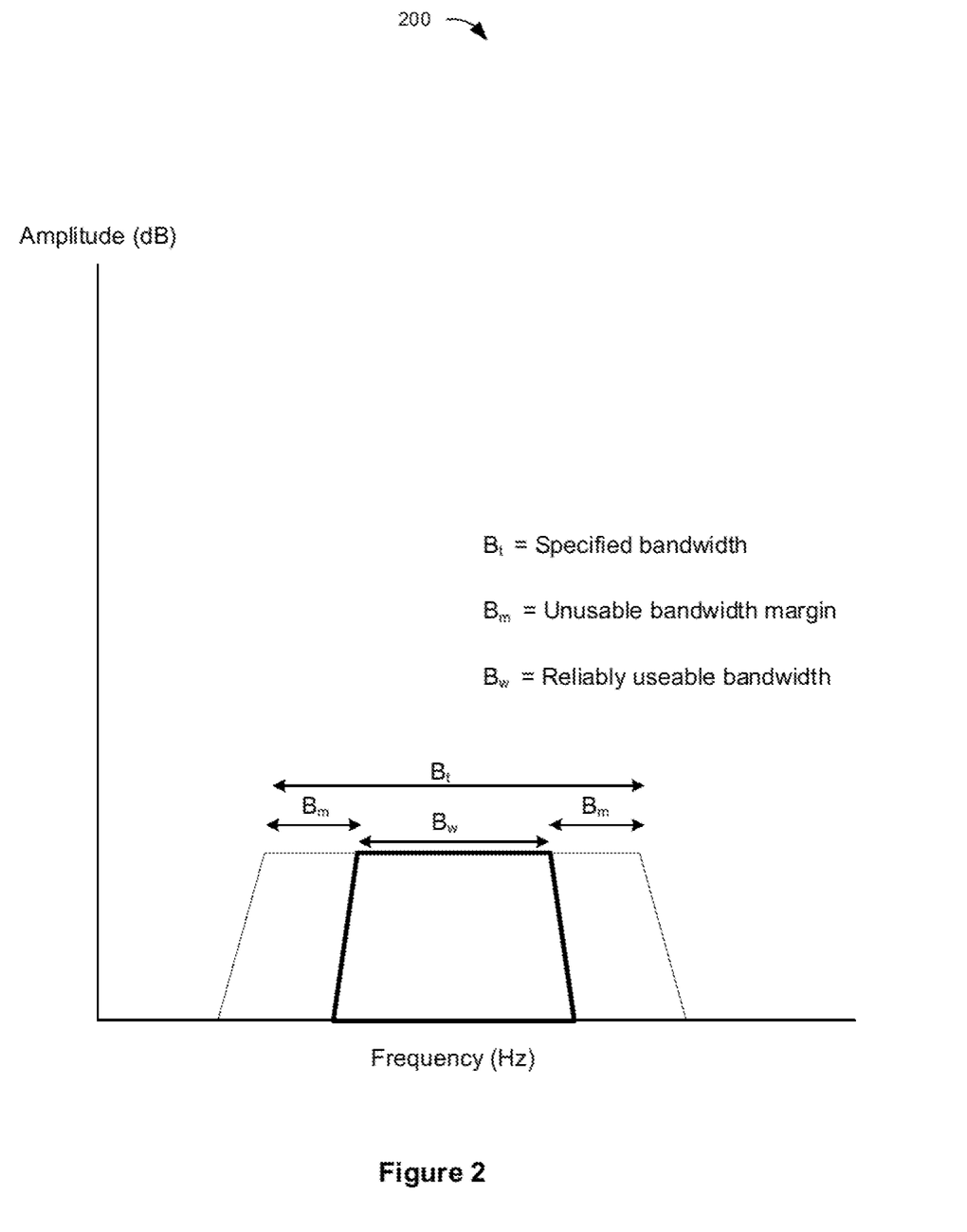
FIG. 2 is a graphical representation of degradations to a specified bandwidth of a wireless channel.

FIG. 2 is a graphical representation 200 of degradations to a specified bandwidth of a wireless channel (e.g., wireless channel 140 in FIG. 1). As illustrated in FIG. 2, the reliably usable bandwidth of the wireless channel, $B_w$, is smaller than the specified bandwidth, $B_t$. As noted above, the impairments to the wireless channel 140 introduce an unusable bandwidth margin, $B_m$, that represents the difference between the specified bandwidth $B_t$ and the reliably usable bandwidth $B_w$. For example, an access point advertises a specified bandwidth $B_t$ of 5 Gbps for the wireless channel 140, but properties of wireless channel 140 degrade the specified bandwidth $B_t$ by 1 Gbps, resulting in a reliably usable bandwidth $B_r$, of 4 Gbps. In certain current systems, the client device relies on the specified bandwidth $B_t$ value of 5 Gbps advertised by a Wi-Fi access point in making decisions as to whether, for example, switch traffic to a cellular base station. However, the specified bandwidth $B_t$ value of 5 Gbps does not reflect the actual (e.g., ground truth) reliably useable bandwidth value of 4 Gbps. Accordingly, in these current systems, the client device may make wireless communication decisions that do not benefit, and perhaps even reduce, the QoE of the application running on the client device.

Figure 3:
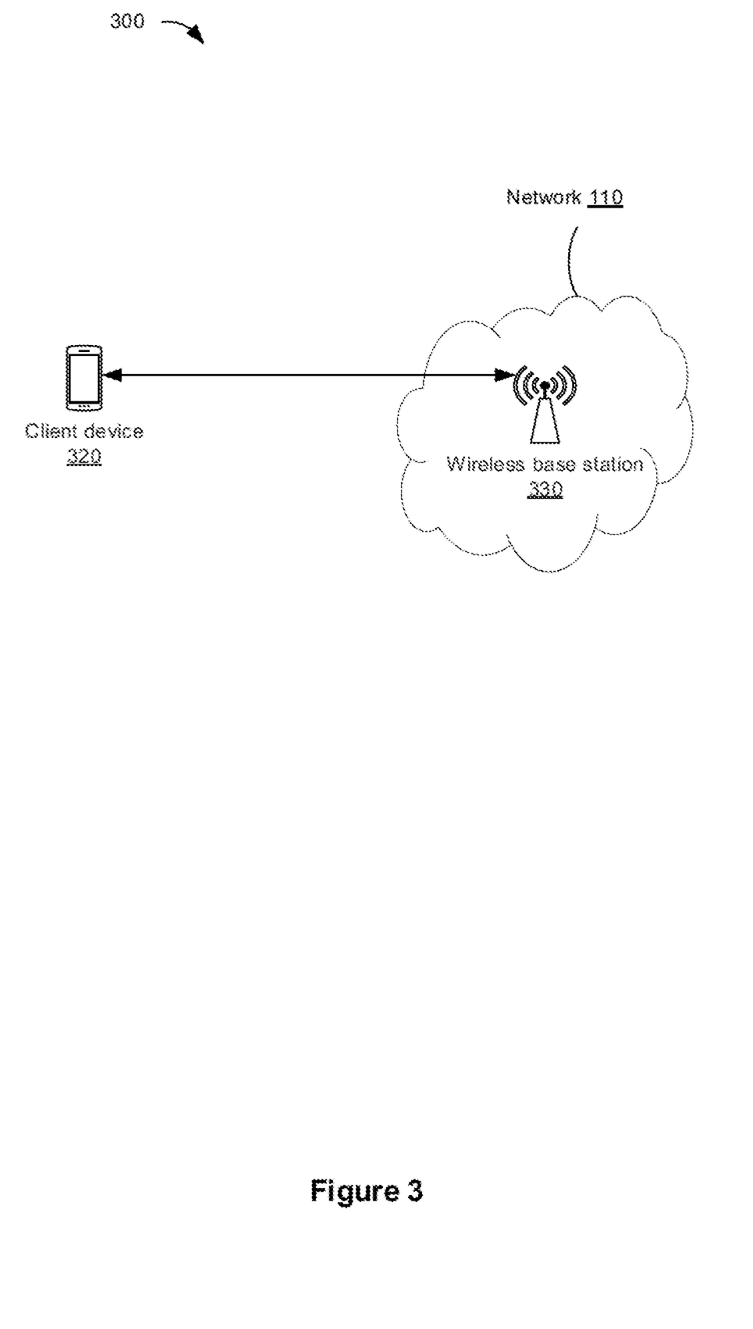
FIG. 3 is a block diagram of another example of a wireless networking environment in accordance with some implementations.

FIG. 3 is a block diagram of an example of a wireless networking environment 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the wireless networking environment 300 includes a client device 320 in communication with a wireless base station 330 (e.g., access point, cellular base station, etc.) in a wireless network 110. In some implementations, the client device 320 corresponds to a mobile phone, laptop, tablet, watch, IoT sensor, autonomous vehicle, AR/VR device, etc.

In various implementations, the client device 320 includes one or more wireless radios in order to enable the client device 320 to communicate with one or more wireless networks 110. In some implementations, the one or more wireless networks 110 are characterized by different radio access technologies (RATs), such as IEEE 802-based technologies (e.g., Wi-Fi, Wi-Max, etc.), cellular technologies (e.g., 4G, LTE, 5G, etc.), and/or the like.

In various implementations, the wireless network 110 includes a wireless base station 330 that provides the client device 320 connectivity to the wireless network 110. In various implementations, the wireless base station 330 provides wireless network access to one or more client devices 320 within a corresponding coverage area. In other words, the wireless base station 330 corresponds to one of a variety of wireless access points for client devices, such as cellular base stations or unlicensed-band access points (e.g., Wi-Fi access points). Particular functionality of the wireless base station 330 may be implemented in accordance to specific standards, and the wireless base station 330 may in turn be referred to by other names particular to specific standards. For example, in some LTE-based implementations, the wireless base station 330 corresponds to an eNodeB (providing coverage to a client device within a cellular network), or a home eNodeB (HeNodeB) providing a femtocell coverage area within a building. As another example, in some 5G-based implementations, the wireless base station 330 corresponds to a gNodeB, having similar functionality to an eNodeB.

In various implementations, the client device 320 is running a particular application, the operation of which entails network communication with the wireless network 110 via the wireless base station 330. In some implementations, the QoE associated with the particular application is sensitive to degradations in traffic transmission and/or reception. For example, in a video streaming or video conferencing application, lost (e.g., dropped) data packets may result in artifacts in the displayed video at the client device 320. As another example, in certain applications (e.g., video conferencing), the client device 320 drops data packets that are delayed beyond a threshold amount. Accordingly, current systems, which fail to account for variances in characteristics of the wireless channel, result in a poor application QoE at the client device 320.

In contrast, implementations disclosed herein utilize the reliably usable bandwidth value associated with the wireless channel and a QoE level value in order to improve application QoE at the client device 320. For example, in some implementations, the wireless base station 330 transmits video traffic to the client device 320 at a rate constrained by a function of the reliably usable bandwidth value and the QoE level value. In response, the client device 320 selects an advantageous video codec, leading to an improved QoE associated with the video application at the client device 320.

Figure 4:
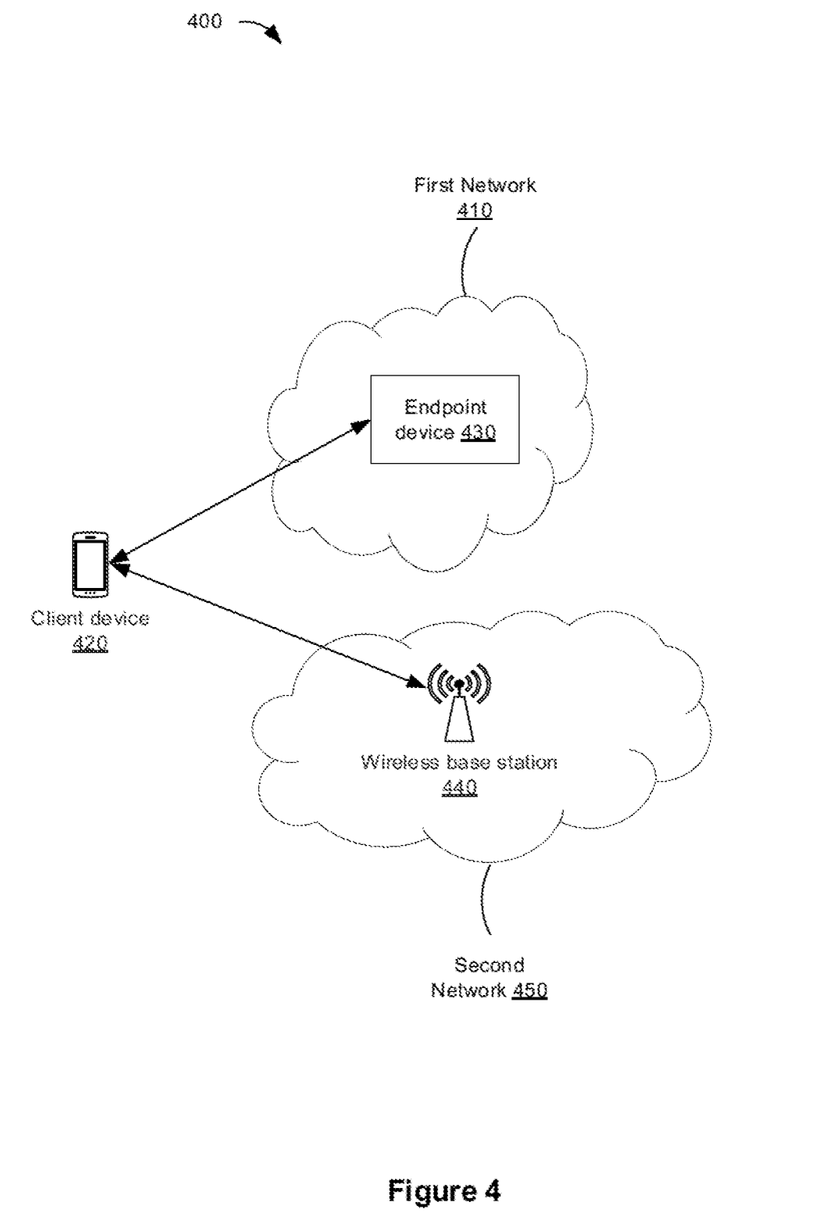
FIG. 4 is a block diagram of yet another example of a wireless networking environment in accordance with some implementations.

FIG. 4 is a block diagram of an example of a wireless networking environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the wireless networking environment 400 includes a multi-radio client device 420 in wireless communication with a first network 410 and a second network 450. One of ordinary skill in the art will appreciate that the wireless networking environment 400 may include more than two networks.

In some implementations, the first network 410 and the second network 450 are characterized by different RATs, such as an IEEE 802-based RAT (e.g., Wi-Fi) and a cellular based RAT (e.g., 4G/LTE/5G). The first network 410 includes an endpoint device 430 that provides the client device 420 with wireless connectivity to the first network 410. The second network 450 includes a wireless base station 440 that provides the client device 420 with wireless connectivity to the second network 450. One of ordinary skill in the art will appreciate that a different endpoint device may alternatively or additionally be included in the second network 450. In some implementations, the endpoint device 430 corresponds to an access point in an IEEE 802-based network, such as Wi-Fi.

The endpoint device 430 determines a data frame transmission rate associated with a particular application running on the client device 420. The data frame transmission rate is constrained by a function of the reliably usable bandwidth value and a quality of experience (QoE) level value. The endpoint device 430 determines the reliably usable bandwidth value of the wireless channel as a function of a wireless channel variance value. The endpoint device 430 obtains the wireless channel variance value. The wireless channel variance value is indicative of a degradation to a specified bandwidth of the wireless channel as a function of conditions of the wireless channel. In various implementations, the endpoint device 430 provides, to the client device 420 over the wireless channel, data frames associated with the particular application running on the client device according to the data frame transmission rate. In various implementations, based on the transmission rate at which the data frames associated with a particular application are received at the client device 420, the client device 420 changes how it receives subsequent data frames associated with the particular application.

As one example, in some implementations, the client device 420 provides instructions to the endpoint device 430 instructing the endpoint device 430 to change how it wirelessly communicates with the client device over the wireless channel. For instance, the client device 420 selects a higher-resolution (e.g., lower compression) video streaming codec in response to detecting the transmission rate of video streaming traffic from the endpoint device 430 satisfies (e.g., exceeds) a first threshold.

As another example, in some implementation, the client device 420 steers traffic from the endpoint device 430 in the first network 410 to the wireless base station 440 in the second network 450 (e.g., steers traffic to another wireless channel). For instance, the client device 420 steers (e.g., sends/receives) video conference traffic towards the wireless base station 440 in response to detecting the transmission rate of video conference traffic from the endpoint device 430 satisfies (e.g., falls below) a second threshold. As another instance, the client device 420 maintains (e.g., does not steer to the second network 450) communicating video conference traffic with the endpoint device 430 in response to detecting that the transmission rate of video conference traffic from the endpoint device 430 does not satisfy the second threshold.

Figure 5:
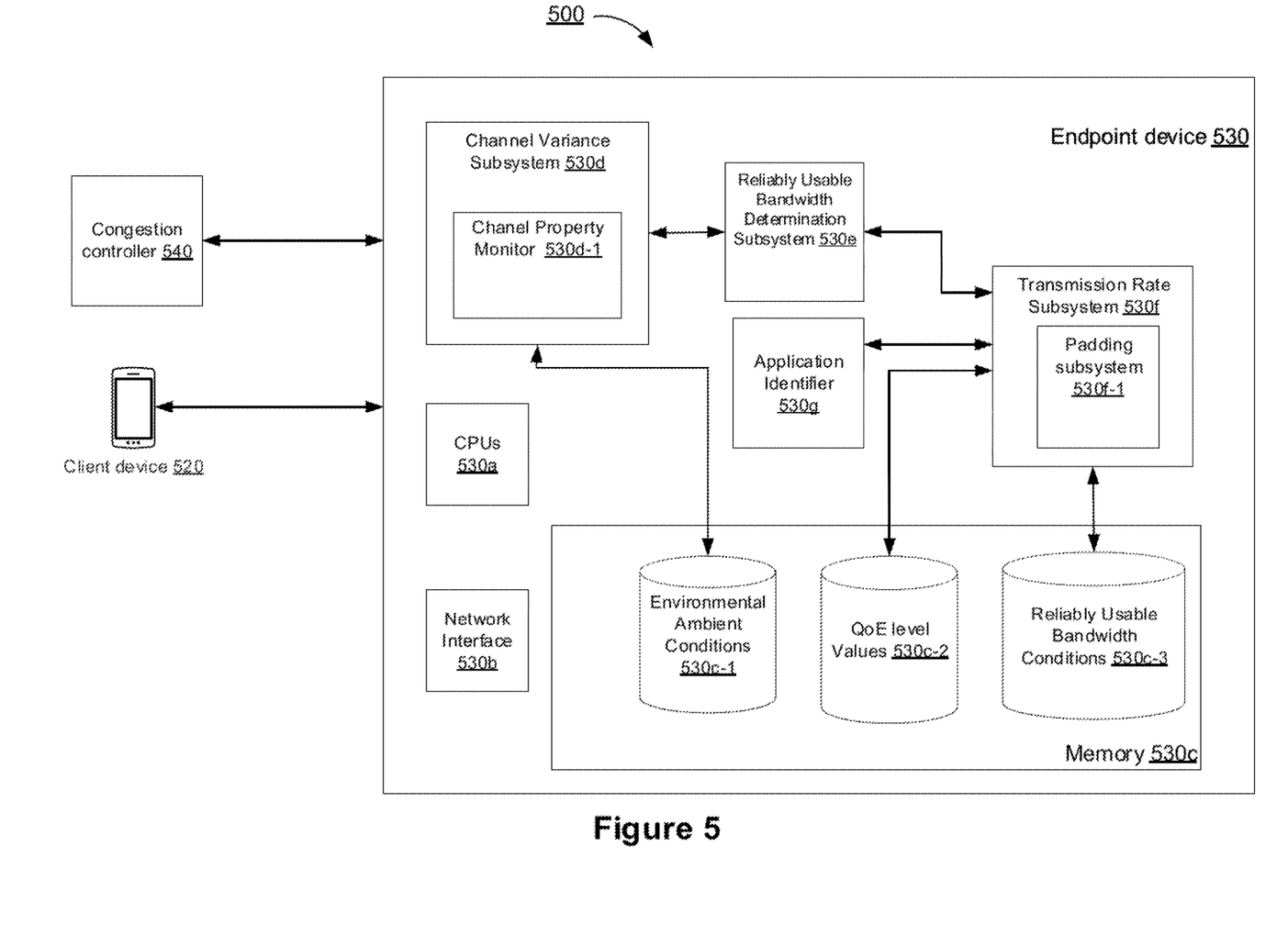
FIG. 5 is a block diagram of yet another example of a wireless networking environment including an endpoint device in accordance with some implementations.

FIG. 5 is a block diagram of an example of a wireless networking environment 500 including an endpoint device 530 in accordance with some implementations. In various implementations, the endpoint device 530 in FIG. 5 is similar to and adapted from the endpoint device 430 in FIG. 4. The endpoint device 530 is in wireless communication with a client device 520 (e.g., client device 420 in FIG. 4 or client device 320 in FIG. 3) over a wireless channel. The endpoint device 530 includes one or more CPUs 530a that provide processing resources for the endpoint device 530. The endpoint device 530 further includes a network interface 530b that provides an input/output interface to the client device 520 and (optionally) other client devices. The endpoint device 530 further includes a memory 530c that provides storage resources for the endpoint device 530. In various implementations, the memory 530c corresponds to a non-transitory memory, such as RAM, ROM, etc.

The endpoint device 530 further includes a channel variance subsystem 530d. The channel variance subsystem 530d obtains a wireless channel variance value associated with the wireless channel that provides the client device 520 with connectivity to the endpoint device 530. The wireless channel variance value is indicative of a degradation to a specified bandwidth of the wireless channel as a function of conditions of the wireless channel. In various implementations, the channel variance subsystem 530d includes a channel property monitor 530d-1. In various implementations, the channel property monitor 530d-1 facilitates obtaining the wireless channel variance value by obtaining properties of the wireless channel. For example, in various implementations, the properties of the wireless channel correspond to one or more of: a received signal strength indication (RSSI) associated with the wireless channel; fading level of the wireless channel; a signal to noise ratio (SNR) level of the wireless channel, noise level of the wireless channel; interference level from other client devices that are also in communication with the endpoint device; energy per bit to noise-power spectral density ratio value of the wireless channel; distortion level of the wireless channel; detected channel usage by background traffic; and/or the like.

In various implementations, the channel variance subsystem 530d obtains environmental ambient conditions 530c-1, in addition to obtaining properties of the wireless channel, in order to facilitate obtaining the wireless channel variance value. For example, in various implementations, the environmental ambient conditions 530c-1 include one or more of: physical obstacles between client device and endpoint device; weather; humidity; distance between the client device 520 and the endpoint device 530, whether the networking components (e.g., client device 520, endpoint device 530) are indoors and/or outdoors; and/or the like.

The endpoint device 530 further includes a reliably usable bandwidth determination subsystem 530e. The reliably usable bandwidth determination subsystem 530e determines a reliably usable bandwidth value (e.g., $B_m$ in FIG. 2) of the wireless channel as a function of the wireless channel variance value. In some implementations, the reliably usable bandwidth value corresponds to the data throughput across the wireless channel. Data throughput may be affected by a variety of factors, including forward error correction (FEC) mechanisms; modulation schemes (e.g., quadrature amplitude modulation (QAM), in phase, etc.); data loss; latency; protocol-type; and/or the like.

In various implementations, the reliably usable bandwidth determination subsystem 530e determines an unusable bandwidth margin value (e.g., $B_m$ in FIG. 2) as a function of the wireless channel variance value. In some implementations, the unusable bandwidth margin value matches the wireless channel variance value within an error tolerance. In some implementations, determining the unusable bandwidth margin value includes scaling down and/or scaling up the wireless channel variance value.

The endpoint device 530 further includes a transmission rate subsystem 530f. The transmission rate subsystem 530f determines a data frame transmission rate associated with a particular application running on the client device. The data frame transmission rate is constrained by a function of the reliably usable bandwidth value and one or more quality of experience (QoE) level value 530c-2. In various implementations, the QoE level values 530c-2 corresponds to one or more of a: playback preference level; playback capability; degradation tolerance; one or more degradation policies; buffer level metric; a bandwidth utilization metric associated with the client device 520 (and/or associated with other client devices); and/or the like. In various implementations, the data frame transmission rate is also based on the unusable bandwidth margin value (e.g., $B_m$ in FIG. 2). In various implementations, determining the data frame transmission rate includes at least one of selecting: a particular codec, a modulation scheme, and/or an error control rate.

In various implementations, the endpoint device 530 further includes an application identifier 530g in order to facilitate determining the data frame transmission rate based on the identified (e.g., detected) application running on the client device 520. For example, in some implementations, the application identifier 530g exploits an application deep frame detection technology, such as Cisco NBAR. Thus, in some implementations, determining the data frame transmission rate includes detecting the particular application running on the client device.

In various implementations, the transmission rate subsystem 530f changes the data frame transmission rate based on one or more reliably usable bandwidth conditions 530c-3. For example, in some implementations, transmission rate subsystem 530f decreases the data frame transmission rate in response to determining that the reliably usable bandwidth value satisfies a first condition (e.g., falls below a first threshold value) of the one or more reliably usable bandwidth conditions 530c-3. In various implementations, in response to detecting a reduced transmission rate associated with the endpoint device 530, the client device 520 begins steering traffic to another wireless channel (e.g., from Wi-Fi to cellular) in order to account for the reduced reliably usable bandwidth. As another example, in some implementations, transmission rate subsystem 530f increases the data frame transmission rate in response to determining that the reliably usable bandwidth value satisfies a second condition (e.g., exceeds a second threshold value) of the one or more reliably usable bandwidth conditions 530c-3. In various implementations, in response to detecting an increased transmission rate from the endpoint device 530, the client device 520 may select a higher performance (e.g., lower compression) codec in order to exploit (e.g., take advantage of) the increased reliably usable bandwidth.

In various implementations, the transmission rate subsystem 530f includes a padding subsystem 530f-1 in order to facilitate changing the data frame transmission rate. For example, in some implementations, the padding subsystem 530f-1 adds (e.g., injects) padding to data frames destined for the client device in response to the transmission rate subsystem 530f determining to decrease the data frame transmission rate. In some implementations, adding padding corresponds to adding FEC padding. As another example, in some implementations, the padding subsystem 530f-1 removes padding from the data frames destined for the client device in response to the transmission rate subsystem 530*f* determining to increase the data frame transmission rate. In some implementations, the padding subsystem 530*f*-1 includes a padding filter (e.g., FEC filter) in order to remove padding from the data frames and/or reconstruct lost packets from FEC data.

In various implementations, the endpoint device 530 coordinates with a congestion controller 540 in order to improve the QoE of applications running on the client device 520. In some implementations, the congestion controller 540 is integrated within the client device 520.

In various implementations, the endpoint device 530 provides, to the client device 520 over the wireless channel, data frames associated with the particular application running on the client device according to the data frame transmission rate. As described above, based on the detected data frame transmission rate from the endpoint device 530, the client device 520 changes how it receives wireless traffic (e.g., change codec, steer traffic to another wireless channel; forego steering traffic), according to various implementations.

Figure 6:
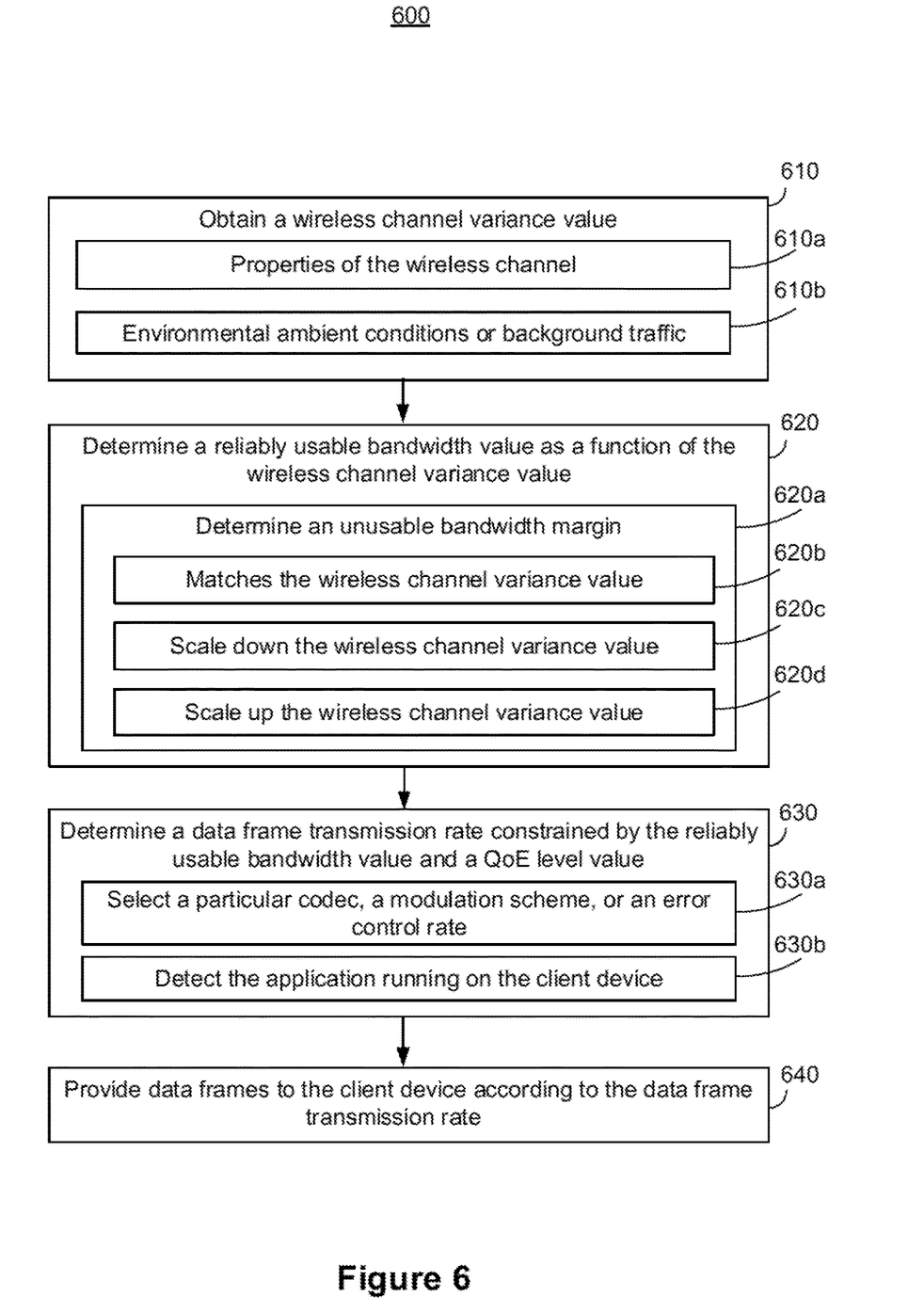
FIG. 6 is a flowchart representation of a method of using wireless channel variance values in order to improve application QoE in accordance with some implementations.

FIG. 6 is a flowchart representation of a method 600 of using wireless channel variance values in order to improve application QoE. In various implementations, the method 600 is performed by an endpoint device, such as the endpoint device 530 in FIG. 5 and/or the endpoint device 430 in FIG. 4. Briefly, the method 600 includes obtaining a variance value of a wireless channel that provides wireless connectivity; determining a reliably usable bandwidth value of the wireless channel from the wireless variance value; and determining a data frame transmission constrained by a function of the reliably usable bandwidth value and a quality of experience (QoE) level value.

To that end, as represented by block 610, the method 600 includes obtaining a wireless channel variance value. The wireless channel variance value is indicative of a degradation to a specified bandwidth of the wireless channel as a function of conditions of the wireless channel. In various implementations, obtaining the wireless channel variance value includes measuring, estimating, calculating based on measurements, and/or obtaining from another entity, information indicative of the wireless channel variance value. In some implementations, the wireless channel variance value corresponds to the variance of the throughput of the wireless channel. As described above, in some implementations, channel variance is caused by a variety of factors, such as temporal fading that results in a reduction in signal amplitude. This and other kinds of fading result in variances in channel conditions, such as variances in RSSI, in both short term (Rayleigh) and long term (log-normal).

In some implementations, the specified bandwidth is a function of expected bandwidth. In some implementations, the specified bandwidth is set by a service level agreement (SLA), 802.11x parameters, quality of server (QoS) parameters, and/or the like. In some implementations, the specified bandwidth corresponds to an advertised network specification, such a Wi-Fi access point advertising that it is capable of supporting an 8 Gbps bandwidth rate.

As represented by block 610*a*, in various implementations, the wireless channel variance value is a function of one or more properties of the wireless channel. In some implementations, the one or more properties of the wireless channel include one or more of a received signal strength indication (RSSI) associated with the wireless channel; fading level of the wireless channel; a signal to noise ratio (SNR) level of the wireless channel; noise level of the wireless channel; interference level from other client devices that are also in communication with the endpoint device; energy per bit to noise-power spectral density ratio value of the wireless channel; and/or distortion level of the wireless channel. In various implementations, the wireless channel variance value is obtained by monitoring (e.g., measuring) physical properties of the RF link, via the channel property monitor 530*d*-1 in FIG. 5. For example, in some implementations, a sliding window measurement of RSSI (in dBm) associated with a depth of N video frames is utilized in order to compute variances in wireless channel conditions.

As represented by block 610*b*, in various implementations, the wireless channel variance value is a function of one or more of: environmental ambient conditions or background wireless traffic. For example, in some implementations, the environmental ambient conditions include one or more of: one or more of physical obstacles between client device and endpoint device; weather; humidity; distance between the client device and the endpoint device; whether the networking components (e.g., client device, endpoint device, other client devices) are indoors and/or outdoors; and/or the like.

As represented by block 620, the method 600 includes determining a reliably usable bandwidth value of the wireless channel as a function of the wireless channel variance value. In some implementations, the reliably usable bandwidth corresponds to throughput. Throughput may correspond to the amount of data that actually moves from one point to another in a network. Throughput is affected by a variety of factors, such as FEC level; modulation scheme (Quadrature amplitude modulation (QAM), in phase, etc.); data loss; latency; protocol; and/or the like.

As represented by block 620*a*, in various implementations, the method 600 includes determining an unusable bandwidth margin value as a function of the wireless channel variance value. As represented by block 620*b*, in various implementations, the unusable bandwidth margin value matches the wireless channel variance value within an error tolerance. As represented by block 620*c*, in various implementations, determining the unusable bandwidth margin value includes scaling down the wireless channel variance value. As represented by block 620*d*, in various implementations, determining the unusable bandwidth margin value includes scaling up the wireless channel variance value.

As represented by block 630, the method 600 includes determining a data frame transmission rate associated with a particular application running on the client device. The data frame transmission rate is constrained by a function of the reliably usable bandwidth value and a quality of experience (QoE) level value. In various implementations, the QoE level value is affected by one or more of: playback preference level; playback capability; degradation tolerance; one or more degradation policies; buffer level metric; and/or a bandwidth utilization metric associated with one or more of the client devices. In various implementations, determining the data frame transmission rate is also based on the unusable bandwidth margin value determined at block 620*a*. As represented by block 630*a*, in various implementations, determining the data frame transmission rate includes at least one of selecting: a particular codec, a modulation scheme, and/or an error control rate. As represented by block 630*b*, in various implementations, the method 600 includes detecting a particular application running on the client device. For example, the method 600 includes utilizing an application detection technology, such as a deep frame inspection application (e.g., Cisco NBAR). In some implementations, determining the data frame transmission rate is also based on the particular application identified as running on the client device.

As represented by block 640, in various implementations, the method 600 includes providing, to the client device over the wireless channel, data frames associated with the particular application running on the client device according to the data frame transmission rate.

Figure 7:
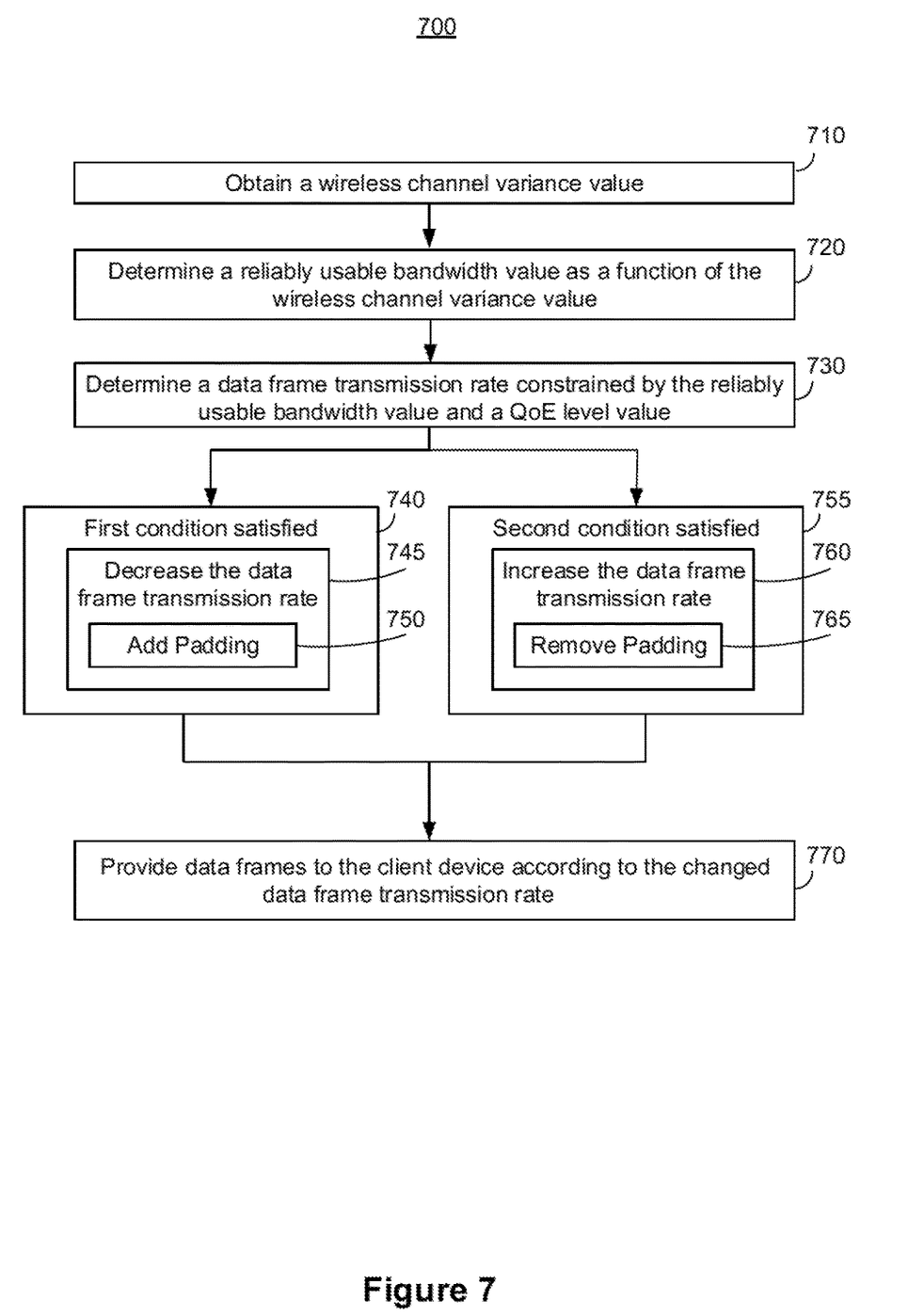
FIG. 7 is a flowchart representation of another method of using wireless channel variance values in order to improve application QoE in accordance with some implementations.

FIG. 7 is a flowchart representation of a method 700 of using wireless channel variance values in order to improve application QoE in accordance with some implementations. In various implementations, the method 700 is performed by an endpoint device, such as the endpoint device 530 in FIG. 5 and/or the endpoint device 430 in FIG. 4. Briefly, the method 700 includes changing a data frame transmission rate across a wireless channel based on changes to a reliably usable bandwidth value associated with the wireless channel.

To that end, as represented by block 710, the method 700 includes obtaining a wireless channel variance value. The wireless channel variance value is indicative of a degradation to a specified bandwidth of the wireless channel as a function of conditions of the wireless channel.

As represented by block 720, the method 700 determining a reliably usable bandwidth value of the wireless channel as a function of the wireless channel variance value.

As represented by block 730, the method 700 determining a data frame transmission rate associated with a particular application running on the client device. The data frame transmission rate is constrained by a function of the reliably usable bandwidth value and a quality of experience (QoE) level value.

As represented by block 740, in various implementations, the method 700 includes determining whether or not the reliably usable bandwidth value satisfies a first condition. In some implementations, the first condition if satisfied if the reliably usable bandwidth value falls below a first threshold value.

As represented by block 745, in various implementations, in response to determining that the reliably usable bandwidth value satisfies the first condition, the method 700 includes decreasing the data frame transmission. Consequently, the transmission rate of traffic associated with the particular application running on the client device is reduced. In various implementations, in response to detecting the reduced transmission rate, the client device selects a lower performance codec or a higher performance wireless link for wireless communication of the traffic associated with the particular application running on the client device. As a result, the packet loss and/or delay is reduced because the client device selects a more suitable codec and/or wireless link.

As represented by block 750, in various implementations, the method 700 includes adding padding to data frames destined for the client device in order to reduce the data frame transmission rate. For example, in some implementations, the endpoint device (e.g., an access point) adds padding to data frames destined for the client device in order to counter the variance. Moreover, in some implementations, if the particular application running on the client device is especially sensitive to jitter/losses, such as video traffic (e.g., video traffic marked "AF41"), then padding is added even if the wireless channel variance value is moderate or low. In some implementations, adding padding when the wireless channel is experiencing a relatively high variance value results in a reduction in pixelization (e.g., associated with the running video application on the client device) at the client device.

As represented by block 755, in various implementations, the method 700 includes determining whether or not the reliably usable bandwidth value satisfies a second condition that is different from the first condition. In some implementations, the second condition is satisfied if the reliably usable bandwidth value exceeds a second threshold value. In some implementations, the method 700 includes executing block 755 before block 740.

As represented by block 760, in various implementations, in response to determining that the reliably usable bandwidth value satisfies the second condition, the method 700 includes increasing the data frame transmission. Consequently, the transmission rate of traffic associated with the particular application running on the client device is increased. In various implementations, in response to detecting the increased transmission rate, the client device selects a higher performance codec, such as a codec associated with a higher video resolution rate. As a result, the quality of the media is increased while preserving low values of packet loss and/or delay. As represented by block 765, in various implementations, the method 700 includes removing padding from data frames destined for the client device in order to increase the data frame transmission rate. For example, in some implementations, a padding filter is used to remove the padding.

As represented by block 770, in various implementations, the method 700 includes providing, to the client device over the wireless channel, data frames associated with the particular application running on the client device according to the changed data frame transmission rate. Accordingly, based on the detected change in transmission rate associated with traffic from the endpoint device, the client device takes one or more actions in order to improve application QoE, as described above.

Figure 8:
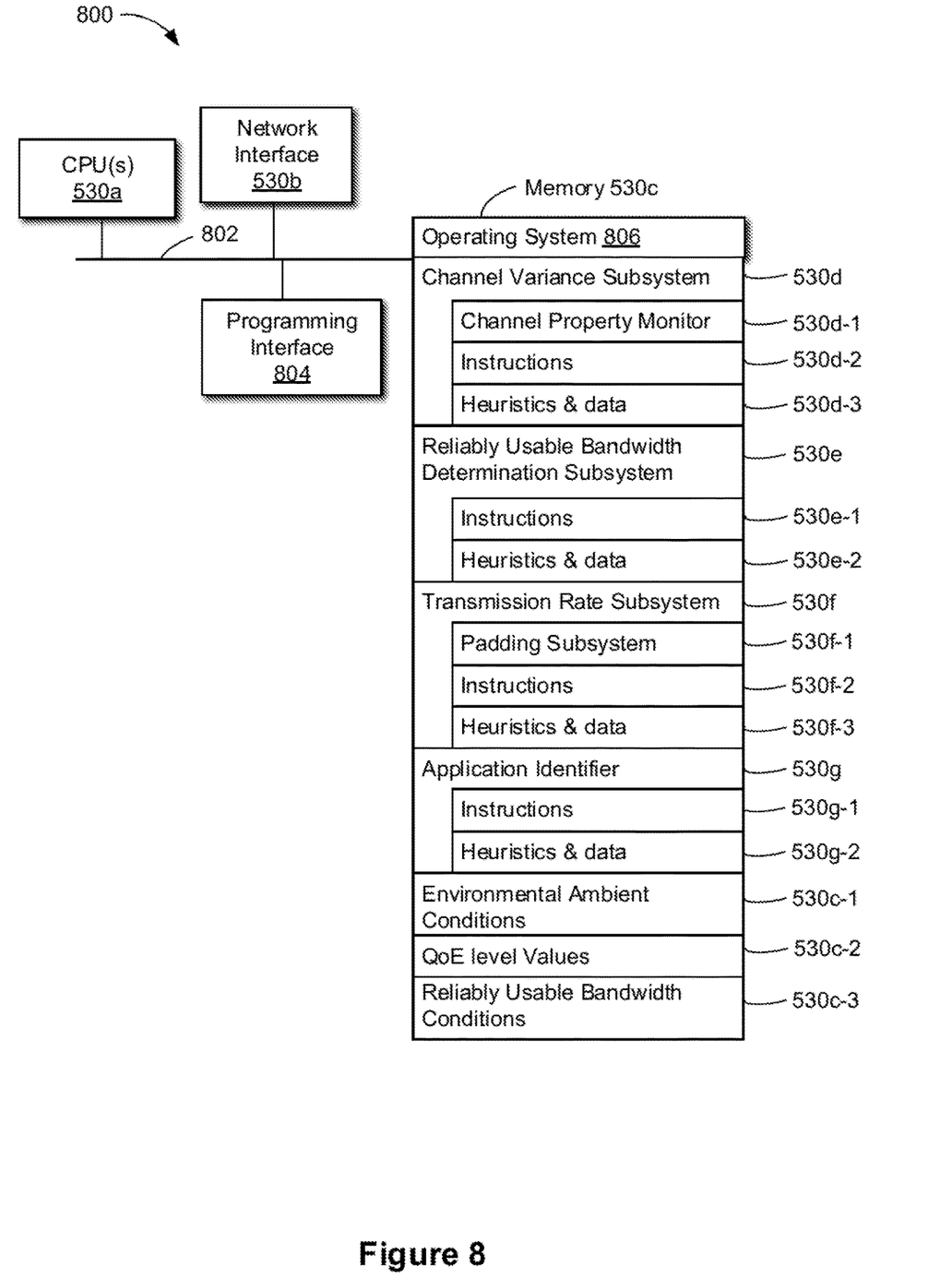
FIG. 8 is a block diagram of an example of an endpoint device in accordance with some implementations.

FIG. 8 is a block diagram of an example of an endpoint device 800 in accordance with some implementations. In some implementations, the endpoint device 800 is similar to and adapted from the endpoint device 530 in FIG. 5 and/or the endpoint device 430 in FIG. 4. While certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the endpoint device 800 includes one or more processing units (CPUs) 530*a*, a network interface 530*b*, a memory 530*c*, a programming (I/O) interface 804, and one or more communication buses 802 for interconnecting these and various other components.

In some implementations, the one or more communication buses 802 include circuitry that interconnects and controls communications between system components. The memory 530*c* includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. The memory 530*c* optionally includes one or more storage devices remotely located from the CPU(s) 530*a*. The memory 530*c* includes a non-transitory computer readable storage medium. In some implementations, the memory 530*c* or the non-transitory computer readable storage medium of the memory 530*c* stores the following programs, modules and data structures, or a subset thereof including an optional operating system 806, a channel variance subsystem 530d, a reliably usable bandwidth determination subsystem 530e, a transmission rate subsystem 530f, an application identifier 530g, environmental ambient conditions 530c-1, QoE level values 530c-2, and reliably usable bandwidth conditions 530c-3.

The operating system 806 includes procedures for handling various basic system services and for performing hardware dependent tasks.

In some implementations, the channel variance subsystem 530d is configured to obtain a wireless channel variance value, wherein the wireless channel variance value is indicative of a degradation to a specified bandwidth of the wireless channel as a function of conditions of the wireless channel. To that end, in various implementations, the channel variance subsystem 530d includes a channel property monitor 530d-1, instructions and/or logic 530d-2, and heuristics and metadata 530d-3. In various implementations, the environmental ambient conditions 530c-1 are provided to the channel variance subsystem 530d in order to facilitate obtaining the wireless channel variance value.

In some implementations, the reliably usable bandwidth determination subsystem 530e is configured to determine a reliably usable bandwidth value of the wireless channel as a function of the wireless channel variance value. To that end, in various implementations, the reliably usable bandwidth determination subsystem 530e includes instructions and/or logic 530e-1 and heuristics and metadata 530e-2.

In some implementations, the transmission rate subsystem 530f is configured to determine a data frame transmission rate associated with a particular application running on the client device, wherein the data frame transmission rate is constrained by a function of the reliably usable bandwidth value and a quality of experience (QoE) level value. To that end, in various implementations, the transmission rate subsystem 530f includes a padding subsystem 530f-1, instructions and/or logic 530f-2, and heuristics and metadata 530f-3. In various implementations, the QoE level values 530c-2 are provided to the transmission rate subsystem 530f in order to facilitate determining the data frame transmission rate. In various implementations, the reliably usable bandwidth conditions 530c-3 are provided to the transmission rate subsystem 530f in order to facilitate determining the data frame transmission rate.

In some implementations, the application identifier 530g is configured to identify (e.g., detect) a particular application running on the client device. To that end, in various implementations, the application identifier 530g includes instructions and/or logic 530g-1 and heuristics and metadata 530g-2.

Moreover, FIG. 8 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an endpoint device including a processor and a non-transitory memory, the endpoint device being in communication with a client device over a wireless channel:
obtaining a wireless channel variance value, wherein the wireless channel variance value is indicative of a degradation to a specified bandwidth of the wireless channel as a function of conditions of the wireless channel;

determining an unusable bandwidth margin value as a function of the wireless channel variance value, wherein the unusable bandwidth margin value corresponds to the wireless channel variance value within an error tolerance;

determining a reliably usable bandwidth value of the wireless channel as a function of the wireless channel variance value and the unusable bandwidth margin value; and determining a data frame transmission rate associated with a particular application running on the client device, wherein the data frame transmission rate is constrained by a function of the reliably usable bandwidth value and a quality of experience (QoE) level value.

2. The method of claim 1, wherein determining the unusable bandwidth margin value includes scaling down the wireless channel variance value.

3. The method of claim 1, wherein determining the unusable bandwidth margin value includes scaling up the wireless channel variance value.

4. The method of claim 1, wherein the wireless channel variance value is a function of one or more properties of the wireless channel.

5. The method of claim 4, wherein the one or more properties of the wireless channel include at least one of: a received signal strength indication (RSSI) associated with the wireless channel, fading level of the wireless channel, a signal to noise ratio (SNR) level of the wireless channel, noise level of the wireless channel, interference level from other client devices that are also in communication with the endpoint device, energy per bit to noise-power spectral density ratio value of the wireless channel, distortion level of the wireless channel, or detected channel usage by background traffic.

6. The method of claim 1, wherein the wireless channel variance value is a function of one or more of: environmental ambient conditions or background wireless traffic.

7. The method of claim 1, wherein determining the data frame transmission rate includes at least one of selecting: a particular codec, a modulation scheme, or an error control rate.

8. The method of claim 1, further comprising:
decreasing or increasing the data frame transmission rate in response to comparing the reliably usable bandwidth value to one or more conditions.

9. The method of claim 8, wherein decreasing the data frame transmission rate includes adding padding to data frames destined for the client device.

10. The method of claim 8, wherein increasing the data frame transmission rate includes removing padding from data frames destined for the client device.

11. The method of claim 1, further comprising, detecting the particular application running on the client device, wherein determining the data frame transmission rate is also based on the particular application running on the client device.

12. An endpoint device comprising:
one or more processors; and
one or more memories collectively containing one or more programs which when executed by the one or more processors performs an operation, the operation comprising:
obtaining a wireless channel variance value, wherein the wireless channel variance value is indicative of a degradation to a specified bandwidth of a wireless channel as a function of conditions of the wireless channel;

determining an unusable bandwidth margin value as a function of the wireless channel variance value, wherein the unusable bandwidth margin value corresponds to the wireless channel variance value within an error tolerance;

determining a reliably usable bandwidth value of the wireless channel as a function of the wireless channel variance value and the unusable bandwidth margin value; and determining a data frame transmission rate associated with a particular application running on a client device, wherein the data frame transmission rate is constrained by a function of the reliably usable bandwidth value and a quality of experience (QoE) level value.

13. The endpoint device of claim 12, wherein the wireless channel variance value is a function of one or more properties of the wireless channel.

14. The endpoint device of claim 12, the operation further comprising:
decreasing the data frame transmission rate by adding padding to data frames destined for the client device in response to determining that the reliably usable bandwidth value satisfies a first condition.

15. The endpoint device of claim 14, the operation further comprising:
increasing the data frame transmission rate by removing padding from the data frames destined for the client device in response to determining that the reliably usable bandwidth value satisfies a first condition.

16. The endpoint device of claim 12, the operation further comprising detecting the particular application running on the client device, wherein determining the data frame transmission rate is additionally based on the particular application running on the client device.

17. A non-transitory computer readable medium storing one or more programs, the one or more programs including instructions, which, when executed by one or more processors of an endpoint device, cause the endpoint device to perform an operation comprising:
obtaining a wireless channel variance value, wherein the wireless channel variance value is indicative of a degradation to a specified bandwidth of a wireless channel as a function of conditions of the wireless channel;

determining an unusable bandwidth margin value as a function of the wireless channel variance value, wherein the unusable bandwidth margin value corresponds to the wireless channel variance value within an error tolerance;

determining a reliably usable bandwidth value of the wireless channel as a function of the wireless channel variance value and the unusable bandwidth margin value; and determining a data frame transmission rate associated with a particular application running on a client device, wherein the data frame transmission rate is constrained by a function of the reliably usable bandwidth value and a quality of experience (QoE) level value.

18. The non-transitory computer readable medium of claim 17, wherein the wireless channel variance value is a function of one or more properties of the wireless channel, wherein the one or more properties of the wireless channel include at least one of: a received signal strength indication (RSSI) associated with the wireless channel, fading level of the wireless channel, a signal to noise ratio (SNR) level of the wireless channel, noise level of the wireless channel, interference level from other client devices that are also in communication with the endpoint device, energy per bit to noise-power spectral density ratio value of the wireless channel, distortion level of the wireless channel, or detected channel usage by background traffic.

19. The non-transitory computer readable medium of claim 17, the operation further comprising:
   decreasing the data frame transmission rate by adding padding to data frames destined for the client device in response to determining that the reliably usable bandwidth value satisfies a first condition.

20. The non-transitory computer readable medium of claim 17, the operation further comprising:
   increasing the data frame transmission rate by removing padding from data frames destined for the client device in response to determining that the reliably usable bandwidth value satisfies a first condition.

* * * * *

UNITED STATES PATENT AND TRADEMARK OFFICE
CERTIFICATE OF CORRECTION

PATENT NO. : 10,841,841 B2
APPLICATION NO. : 16/133314
DATED : November 17, 2020
INVENTOR(S) : Malcolm Muir Smith et al.

Page 1 of 1

It is certified that error appears in the above-identified patent and that said Letters Patent is hereby corrected as shown below:

In the Specification

In Column 4, Line 48, delete "$B_t$," and insert -- $B_w$ --, therefor.
In Column 7, Line 54, delete "$B_m$" and insert -- $B_w$ --, therefor.

Signed and Sealed this
Twenty-ninth Day of December, 2020

Andrei Iancu
*Director of the United States Patent and Trademark Office*